(12) United States Patent
Goldberg

(10) Patent No.: US 6,341,183 B1
(45) Date of Patent: Jan. 22, 2002

(54) GRAPHICAL USER INTERFACE FOR IMAGE ACQUISITION AND PROCESSING

(75) Inventor: Kenneth A. Goldberg, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/181,036

(22) Filed: Oct. 27, 1998

(51) Int. Cl.$^7$ ................................................ G06K 9/36
(52) U.S. Cl. ....................... 382/276; 382/305; 345/762
(58) Field of Search ................................. 382/276, 280, 382/305; 345/114, 431, 340, 440, 347, 357, 418, 432, 589, 594, 617, 619, 650, 762, 763, 835; 356/345, 121, 341–346, 352

(56) References Cited

U.S. PATENT DOCUMENTS

| 4,391,142 A | * | 7/1983 | Cantrell, Jr. et al. ........... 73/610 |
| 5,221,834 A | * | 6/1993 | Lisson et al. ............ 250/201.9 |
| 5,530,796 A | * | 6/1996 | Wang ........................ 345/352 |
| 5,561,753 A | * | 10/1996 | Coulombe et al. .......... 395/155 |
| 5,610,707 A | * | 3/1997 | Duncan et al. ............. 356/121 |
| 5,874,966 A | * | 2/1999 | Polimeni et al. ............ 345/431 |
| 5,917,492 A | * | 6/1999 | Bereiter et al. ............. 345/357 |
| 5,936,720 A | * | 8/1999 | Neal et al. .................. 356/121 |
| 6,088,099 A | * | 7/2000 | Cabib et al. ................ 356/345 |

* cited by examiner

Primary Examiner—Leo Boudreau
Assistant Examiner—Kanji Patel
(74) Attorney, Agent, or Firm—John P. O'Banion

(57) ABSTRACT

An event-driven GUI-based image acquisition interface for the IDL programming environment designed for CCD camera control and image acquisition directly into the IDL environment where image manipulation and data analysis can be performed, and a toolbox of real-time analysis applications. Running the image acquisition hardware directly from IDL removes the necessity of first saving images in one program and then importing the data into IDL for analysis in a second step. Bringing the data directly into IDL creates an opportunity for the implementation of IDL image processing and display functions in real-time. program allows control over the available charge coupled device (CCD) detector parameters, data acquisition, file saving and loading, and image manipulation and processing, all from within IDL. The program is built using IDL's widget libraries to control the on-screen display and user interface.

13 Claims, 7 Drawing Sheets

FIG. −7

GRAPHICAL USER INTERFACE FOR IMAGE ACQUISITION AND PROCESSING

STATEMENT REGARDING FEDERALLY SPONSORED RESEARCH OR DEVELOPMENT

The United States Government has rights in this invention pursuant to Contract No. DE-AC03-76SF00098 between the United States Department of Energy and the University of California.

CROSS-REFERENCE TO RELATED APPLICATIONS

Not Applicable

REFERENCE TO A MICROFICHE APPENDIX

Not Applicable

NOTICE OF MATERIAL SUBJECT TO COPYRIGHT PROTECTION

All of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

INCORPORATION BY REFERENCE

The following publications, which are referred to herein by reference numbers placed inside square brackets (e.g. [1]) are incorporated herein by reference:

[1] Takeda, M., H. Ina, and S. Kobayashi "Fourier-transform method of fringe pattern analysis for computer-based topography and interferometry," J. Opt. Soc. Am., 72 (1), 156–60 (1981).

[2] Kreis, T. M., "Digital holographic interference-phase measurement using the Fourier-transform method," J. Opt. Soc. Am. A, 3 (6), 847–55 (1986).

[3] Wang, J. Y. and D. E. Silva, "Wave-front interpretation with Zernike polynomials," Applied Optics, 19 (9), 1510–18 (1980).

BACKGROUND OF THE INVENTION

1. Field of the Invention

This invention pertains generally to computer systems, and more particularly to a graphical user interface for CCD camera control, and image acquisition, processing and analysis.

2. Description of the Background Art

A Graphical User Interface (GUI) is a convenient mechanism for a user to interface with a computer. A GUI displays various graphical objects on a screen which can be selected with a pointing device such as a mouse. The user need only move the pointing device to position a cursor over an object to be selected, and click a mouse button to select the object. In response, an application program or procedure is executed. The operating system in most modern computer systems provides a GUI for the user to run application programs, manipulate files and perform other operation functions. Application programs also often provide a GUI for assisting the user with operation of the application program.

However, no application program exists that is capable of providing a GUI for the fully customizable image processing tools provided by the interactive data language (IDL) programming environment developed by Research Systems, Inc. Nor is there any existing software application or analysis toolbox for the IDL environment. Prior to the present invention, in order to process image data using IDL, it was necessary to record data with one program and then transfer the data to IDL for subsequent processing. Additionally, prior to the present invention, analysis of the image data could only be performed after the image data was acquired, saved and reloaded by an analysis program. Thus, multiple programs were required, as well as external handling of data between the programs. Therefore, a need exists for a GUI which integrates these functions. The present invention satisfies that need, as well as others, and overcomes the deficiencies in previously developed systems for camera control and image acquisition, processing and analysis.

BRIEF SUMMARY OF THE INVENTION

The present invention generally comprises an event-driven graphical user interface (GUI)-based image acquisition interface for the interactive data language (IDL) programming environment developed by Research Systems, Inc. The program is designed for charge coupled device (CCD) camera control and image acquisition directly into the IDL environment where image manipulation and data analysis can be performed. Running the image acquisition hardware directly from IDL removes the necessity of first saving images in one program and then importing the data into IDL for analysis in a second step. Real-time analysis is essential in many experimental circumstances where a CCD detector is used in the data acquisition. Bringing the data directly into IDL creates an opportunity, previously unavailable, for the implementation of IDL image processing and display functions in real-time. An additional feature polls the present state of experimental systems and records a number of parameters with the image data.

The top-level program allows control over the available charge coupled device (CCD) detector parameters, data acquisition, file saving and loading, and image manipulation and processing, all from within IDL. The program is built using IDL's widget libraries to control the on-screen display and user interface. A library of low-level driver C-code programs developed by Photometrics is called from IDL to execute the camera controls.

The program is designed for rapid and convenient control of the available parameters, in an interface designed to simplify data acquisition and manipulation for the user. Since it is an event-driven program, at any time the user is free to choose the next action from all of the available features of the program.

Additionally, the present invention provides a toolbox of real-time analysis applications for use in connection with an extreme ultraviolet (EUV) phase-shifting point-diffraction interferometer (PS/PDI). The EUV PS/PDI has been implemented to perform at-wavelength interferometric testing of lithographic optical systems operating at 13-nm wavelength. Alignment of the interferometer is a highly demanding process requiring micron-scale coarse adjustments, and fine adjustments on the scale of tens of nanometers. Accordingly, several alignment procedures that involve image-processing and analysis of the images recorded during alignment have been developed as an aspect of the present invention. These procedures all benefit from rapid processing and feedback directly within the image-acquisition program. The alignment and analysis toolbox described here provides these new tools in the manner described below. Such tools are unavailable in any current software application known to the inventor.

Furthermore, the integration of high-level image-processing procedures designed specifically for the PS/PDI, but not limited to this application alone, make this analysis toolbox a unique and powerful addition to image acquisition software. Nearly any kind of image processing tool can be added to the toolbox. For example, not only are CCD cameras used in interferometry, but in microscopy, astronomy and geology. The present invention can fill nearly any electronic imaging and processing requirement.

An object of the invention is to provide complete control of a CCD detector and processing of acquired image data from within a single GUI computer program.

Another object of the invention is to provide a GUI interface for electronic imaging and processing software.

Another object of the invention is to integrate real-time image processing and data analysis functions with image acquisition software.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

For illustrative purposes the present invention will now be described with reference to FIG. 1 through FIG. 8. It will be appreciated, however, that the invention may vary as to configuration and as to the details thereof without departing from the basic concepts as disclosed herein.

Figure 1:
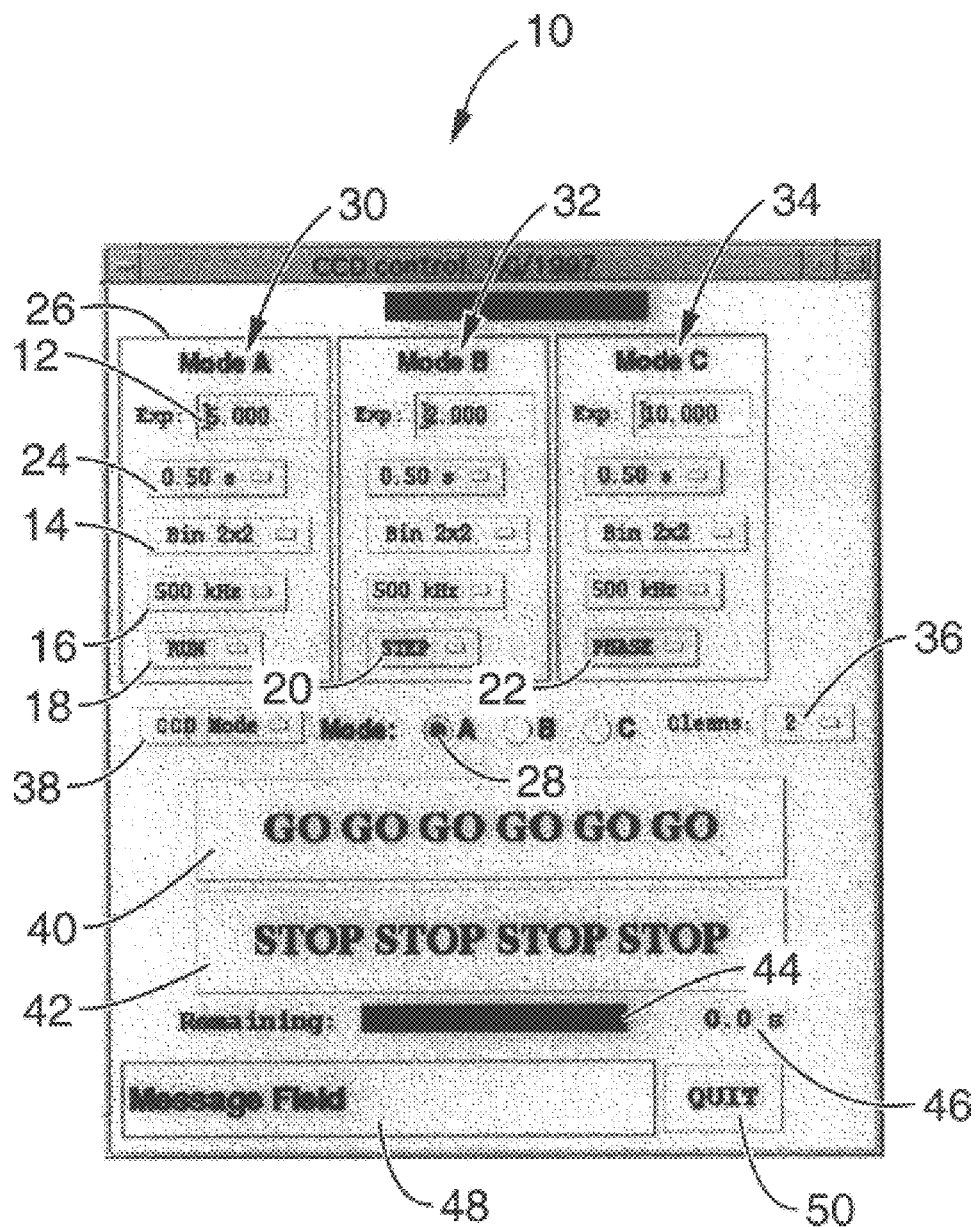
FIG. 1 is a CCD control window in accordance with the present invention.
Figure 2:
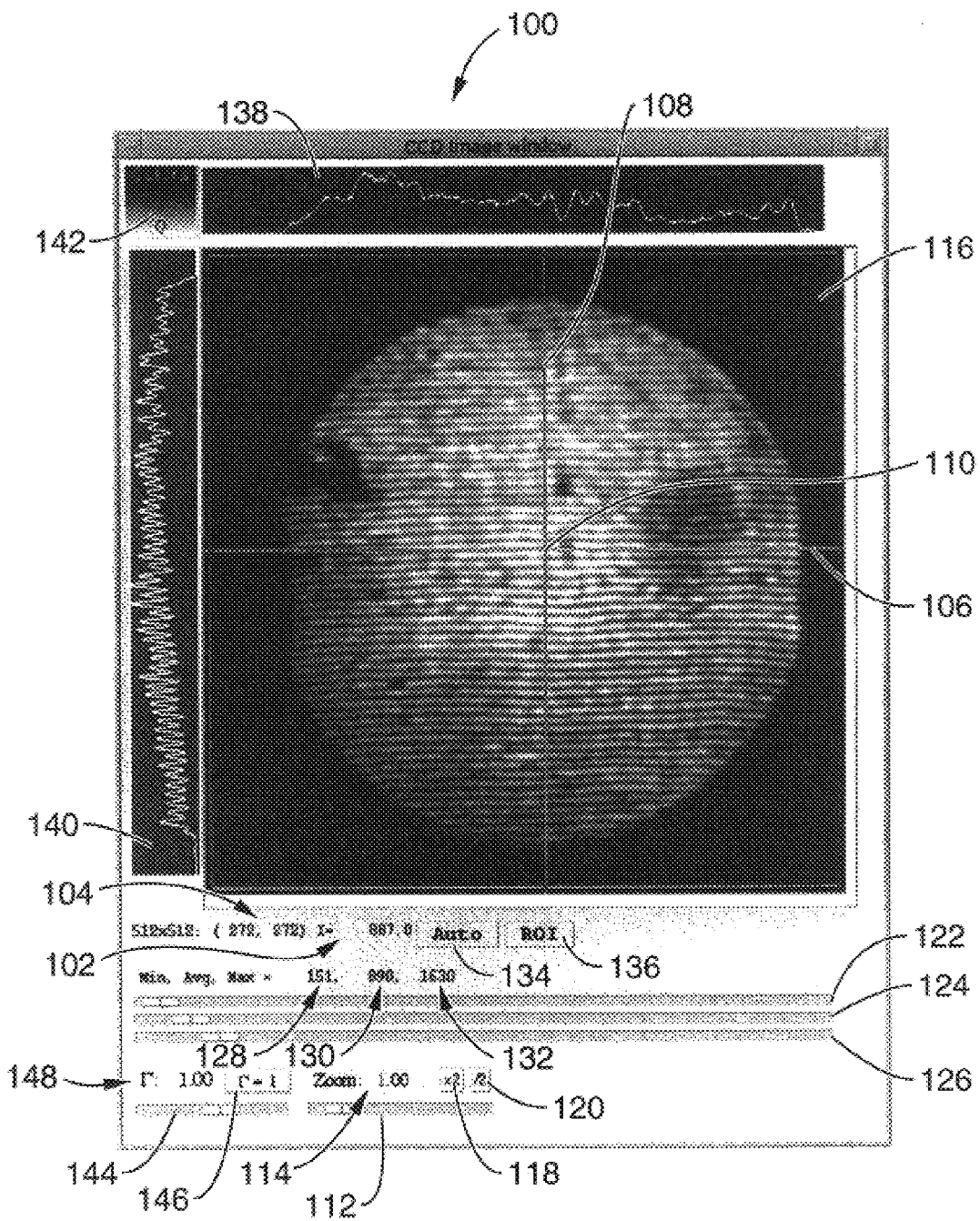
FIG. 2 is a CCD image window in accordance with the present invention.
Figure 3:
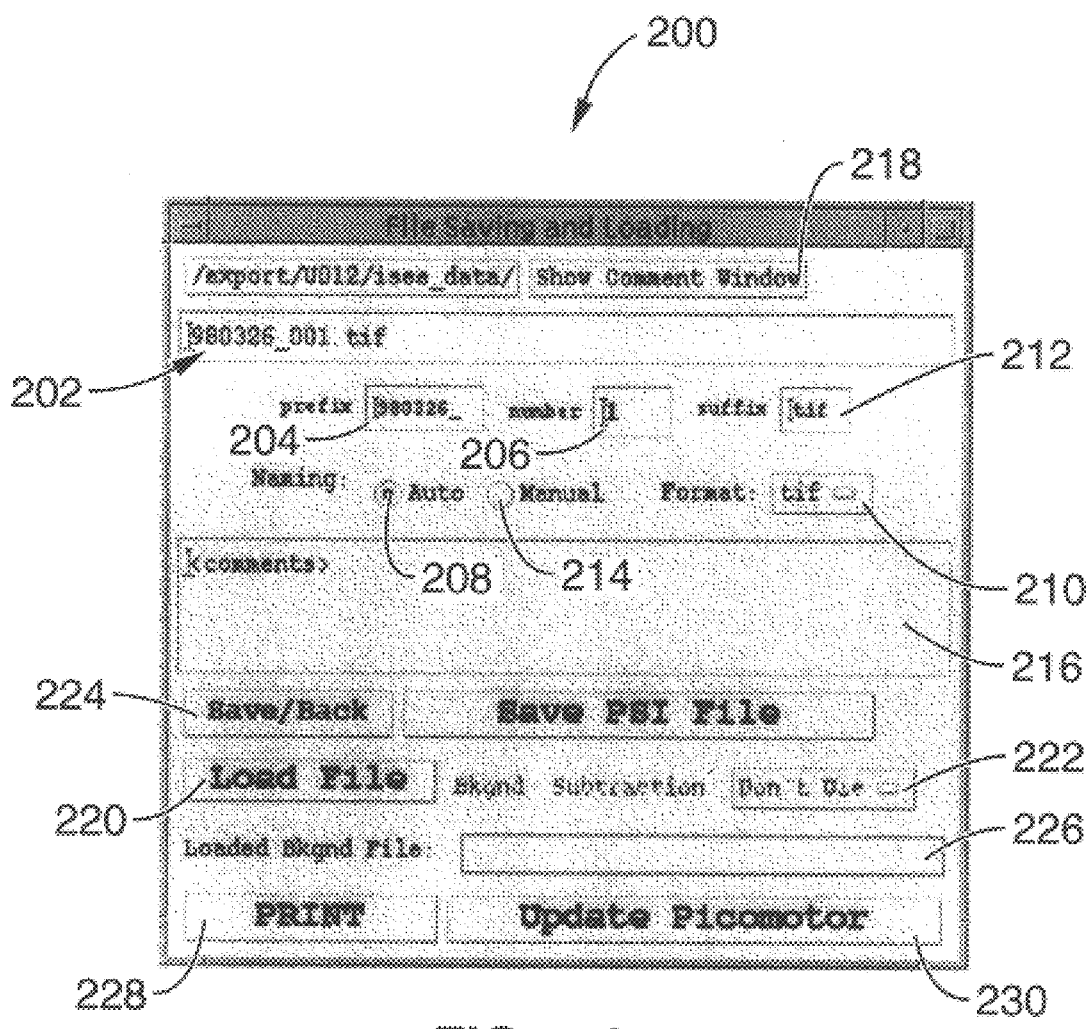
FIG. 3 is a file saving and loading window in accordance with the present invention.

The present invention generally comprises a GUI-based image acquisition interface for IDL. The interface is event driven and provides a plurality of functions that can be categorized into the following groups: CCD detector control, image display and manipulation, and file saving and loading. Referring to FIG. 1 through FIG. 3, three of the main program windows are shown. The feature categorization, by function, is reflected in the contents of the individual windows; each window contains a related set of features. Although their positions on-screen may be adjusted, causing them to overlap, these windows and the features they contain are always present and available.

1. CCD Detector Control

During image acquisition, a CCD detector can be used in many ways. The exposure time adjusts to accommodate the available light level and the type of measurement being made. At full resolution, the CCD detector may take seconds to transmit data to the computer. Hardware binning allows the computer to group sets of detector pixels, thus improving read-out speed and increasing the detector sensitivity, but reducing the spatial resolution of the device. This mode is often selected during system alignment. In some cases it is desirable to run the camera continuously, recording and displaying images in series. At other times, the acquisition of a single image is needed. Additionally, the acquisition and automatic file-saving of a small number of images in data series is often necessary. The present invention accommodates these modes of operation. The read-out speed of the CCD camera affects the accuracy and noise in the measurements. The available modes are selectable on-screen.

Referring to FIG. 1, which shows a CCD control screen 10, the GUI interface program of the present invention provides the following features:

1.1 Exposure time. Arbitrary values for exposure times 12 may be entered from the keyboard. Also, several commonly-used exposure times are available using a pulldown menu (not shown).

1.2 Hardware binning. Using a pulldown menu, commonly used hardware binning options 14 are available.

1.3 Readout Speed. The available detector speeds 16 are available from a pulldown menu.

1.4 Acquisition mode. Here, the user selects from the following modes: "Run" 18 is the continuous acquisition and display of images, "Step" 20 is single-image acquisition mode, "Phase" and "Focus" 22 both record multiple images in a series and automatically save them with sequential file names.

1.5 Shutter Open/Close Delay. A shutter open/close delay button 24 gives the user access to hardware-adjustable delay-times that synchronize the CCD camera read-out with the opening and closing of the shutter mechanism. This feature is an important way to overcome the limitations of a slow shutter mechanism.

1.6 User Modes. The above five parameters are available in several customizable data acquisition "modes" 26 selected by buttons 28. For example, the user can configure mode A 30 to be optimized for alignment, with rapid data collection, while mode B 32 is configured for high-accuracy with longer exposure times, different hardware binning, readout speed, and shutter delays. In order to switch quickly from one set of parameters to another, the user pushes only one button 28 and selects from modes A 30, B 32 or C 34. The computer automatically stores these configurations in a file, and recalls them when the program is run. Three modes are shown, but the program can accommodate any number of modes.

This feature is a significant advantage over existing software in several ways. Having multiple modes allows the user to switch all of the available configuration parameters with one click, thus saving time. The configuration data fields are always present on the screen, meaning that they are always accessible. Other existing software programs call up dialog windows that are opened and closed as each parameter is adjusted. That method is very inefficient and time-consuming for the user.

1.7 Cleans. This determines the number of images the CCD rapidly reads and discards before the image to be inspected is recorded. Cleans 36 can improve the noise properties of the detector.

1.8 CCD Mode/Demo Mode. The program can be run independently from the CCD control hardware and includes a CCD Mode/Demo Mode selector 38. In Demo Mode, all of the features of the program are available except data acquisition: file loading/saving and image manipulation, for example, can be used. Selection of CCD Mode initiates communication with the CCD hardware, and prepares the program for image-acquisition.

1.9 Large "GO" and "STOP" buttons. Many CCD interface programs use small buttons for these, the most commonly accessed commands. The large button sizes for the GO button 40 and the STOP button 42 make them easier to access, and ensure that they are not as easily obscured by overlapping windows on the screen. The features of the program are not disabled during exposures. Therefore, all analysis and system configurations are "awake" during exposure. The STOP button is capable of aborting an exposure, and closing the shutter to protect the CCD detector.

1.10 Time remaining. As the images are being recorded, the remaining time is shown with a moving white status bar 44 in a black field. The remaining time 46 in tenths-of-a-second is also shown, adjacent to the bar. This feature adds greatly to the user-friendliness of the program, especially during long exposures.

1.11 Message Field. It is often difficult with other CCD programs to know what the computer is doing during pauses. This program keeps the user updated by displaying numerous messages in the Message Field 48. Messages tell the user that data is being gathered, transferred to the computer, or is done being read. The CCD temperature is also displayed in this field whenever the CCD software is first accessed. During the collection of multiple-image data series, the Message Field displays the present step number and total number of steps: "2/5", for example, represents the second of five images. It will be appreciated that the Message Field could be modified to provide any useful operational information.

1.12 Quit. A Quit button 50 is also provided to close the window.

2. Image-Display and Manipulation

As the CCD images are recorded and transferred to the computer, they are immediately displayed on the screen in the image-display window 100 shown in FIG. 2. The window is a very flexible environment for inspecting and observing the image data. With a mouse, the user can click on a point in the image display and learn the brightness value 102 of the individual pixel and the coordinate 104 of the pointer. As can be seen in FIG. 2, horizontal 106 and vertical 108 line-outs are shown through the image, intersecting at the "clicked" point 110. To accommodate images of different intensity levels, the display ranges are fully adjustable across the range of acceptable values. The display ranges can be determined manually or automatically, and the user can select an arbitrary rectangular sub-region of the image to use as a guide for the display range. The display color palette is adjustable in several ways offering different color tables or grayscales, and gamma-scaling.

Several features of the image-display and manipulation window are as follows:

2.1 Zoom. The image size can be scaled for display from ¼-th size to 8 times larger in multiples of ¼ size using a scroll-bar, or slider 112, and the zoom level 114 is displayed. The adjustable on-screen window only shows the portion of the zoom-scaled image 116 that fits within its display size. If the image is larger than the display, scroll-bars appear within the window, and the entire image is always available for inspection. Two buttons 118, 120 are provided to magnify or de-magnify by a factor of two, respectively. This saves the user time by bypassing the scroll-bar.

2.2 Scaling for display. The digital images must be scaled for display. Typically this means that some lower-intensity level is shown as black on the screen, and an upper level is white. The bounds of this range are adjustable using an intelligent Minimum/Average/Maximum trio of scroll-bars 122, 124, 126, respectively. The bars are very long to provide fine on-screen control. The Minimum 122 and Maximum 126 scroll-bars operate independently; however the program does not allow the Minimum to exceed the Maximum, nor the Maximum to go below the Minimum. The Average scroll-bar 124 always tries to be at the position of the mean value. Adjusting it changes the intensity level that is shown as middle-gray, while automatically maintaining a constant separation range of the minimum and maximum values. The Minimum, Average and Maximum values 128, 130, 132, respectively, are also displayed.

2.3 Auto and ROI. The Auto button 134 tells the computer to select the appropriate scaling automatically. The computer bases the intensity range on the minimum and maximum values of a median-filtered copy of the entire image. Filtering removes spurious points which can cause the computer to pick an inappropriate scale. ROI stands for "region of interest" and refers to a user-selectable rectangular sub-region of the image. The ROI button 136 bases the scaling on the intensity range within the region of interest only. Automatic scaling can be based on either the full image or a user selected sub-region of an image.

2.4 Point and Region selection. The mouse can be used to select a point-of-interest (single-click) and separately a rectangular region-of-interest (click-and-drag) from the image. While a single click of the left button selects a point, a double-click turns on a continuous point-selection feature that tracks the location of the mouse pointer. Once a region is defined, the middle mouse button of a three-button mouse, can be used to move the selection box around the image via a click-and-drag operation. The box maintains its shape and size as it moves.

2.5 Lineout display. Image cross-sections or "line-outs" are displayed in separate graphic windows at the top 138 and left-side 140 of the image-display region. These plots show the intensity along a single line horizontally and vertically through the image at the position of the selected point-of-interest. The plot scalings match the selected scaling of the image-display. Lineout display may be turned on and off by clicking in the lineout windows.

2.6 Color Tables. A number of color tables are available for display. The square in the upper-left of the window is a button 142 that cycles through the available color tables. The face of the button shows the index number of the table, and also the full scaling that is used. There are four standard color tables available, and each is useful for different things. The four are: linear grayscale, 16-level grayscale, "red-temperature", and "rainbow."

2.7 Gamma Scale. Gamma scaling is a common way to implement exponential and logarithmic color table scaling in a continuous manner. A scroll-bar 144 is used to quickly increase or decrease the contrast of the display in a continuous manner. A gamma value of 1.0 yields a linear scale. For all other values, the scale follows an exponential curve of order greater than or less than one. A button 146 is provided to return the gamma value to one. In addition, the gamma value 148 is displayed.

3. File Saving and Loading

The program is equipped with convenience-driven file saving and loading features. Referring to FIG. 3, a file saving and loading window 200 is shown. The program selects a file name 202 based on the date 204 and an index number 206 for the file. By choosing automatic name selection with button 208, the program searches the default file-saving directory and selects an image index number 206 one greater than that of the most recently saved file. Data can be stored in several file formats selected by a pull-down menu 210, and the program selects an appropriate file-name suffix 212 for each. Manual file-name selection is also possible with button 214, and the name, number and suffix are fully adjustable in Manual mode. A small ASCII (text) "log file" is created for each saved image, containing all of the CCD parameters used in the image-recording, user comments, and additional parameters of interest (see discussion of Update Picomotors button 230, below). With a comment window 216, selected by button 218, the user tells the program what type or category of image is being recorded using a pre-defined three-letter abbreviation chosen from a list, or a manually-entered abbreviation, as will be described in more detail below with reference to FIG. 4. The file number index is incremented automatically for the next image. The Load File button 220 begins a menu-driven dialog in which the user selects a file for loading. Once loaded, a file behaves in the same manner as any file recorded by the detector.

The program is capable of using background subtraction, a powerful technique used in scientific imaging applications whereby the intensity values of one image are subtracted from the second. In this way small variations between two images can be revealed. Background subtraction can be turned off using a disable button 222. The Save/Back button 224 saves the present file and then uses it as the background. Any saved file can be loaded as a background; then it is automatically subtracted from the current image for display, until background subtraction is turned off. The name of the file presently loaded for background subtraction is shown in the window 226. The background subtraction feature is disabled until an appropriate background file has been loaded, which is shown in display 226.

Images on screen can be sent to a postscript printer with the Print button 228. Two labeled copies of the same image are printed on the same page. One is large, and the second is a smaller thumbnail image appropriate for pasting into an experiment log-book. The printed image uses the same color table as is set for the screen display.

Figure 4:
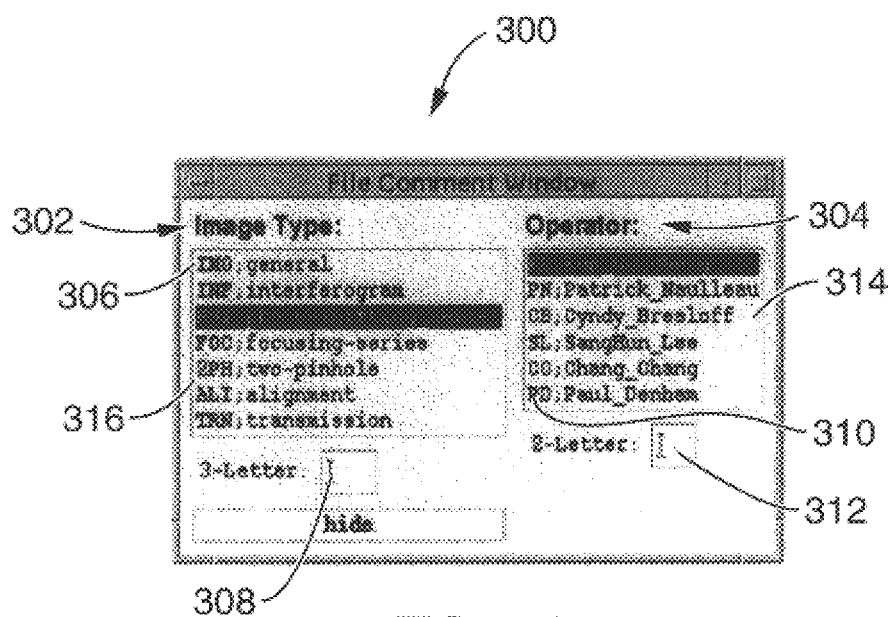
FIG. 4 is a file comment window in accordance with the present invention.

Referring to FIG. 4, a file comment window 300 allows the user to specify which type 302 of image is being recorded, and to record the name of the operator 304 using the program. The image type is saved as a three-letter abbreviation 306, as stated above, and is shown in window box 308. The operator names are stored as two-letter initials 310 and shown in window box 312. The lists of operator names 314 and image types 316 are stored in editable text files read by the program at start-up. Additional comments can be typed into the four-line comment window 216 shown in FIG. 3. These comments persist for subsequent images unless the comment field is changed. This method of image type specification saves the user the necessity of typing comments for each individual image. The use of small text log files enables users to later scan the comments and saved parameters rapidly when looking for specific images by category.

Developed separately from this program is an IDL widget application designed to control the electronic translation stages that operate an extreme ultraviolet interferometer. Because this application is also written in IDL, and can be run in the same IDL session, the two programs can share global variables, including motor positions and other parameters of interest. In the File Saving and Loading window, the Update Picomotors button 230 shown in FIG. 3 instructs the CCD control program to check the current value of these experimental parameters. In this way, these values are available for recording in the log-file with the CCD parameters comments and other information.

4. Statistics Window

Figure 5:
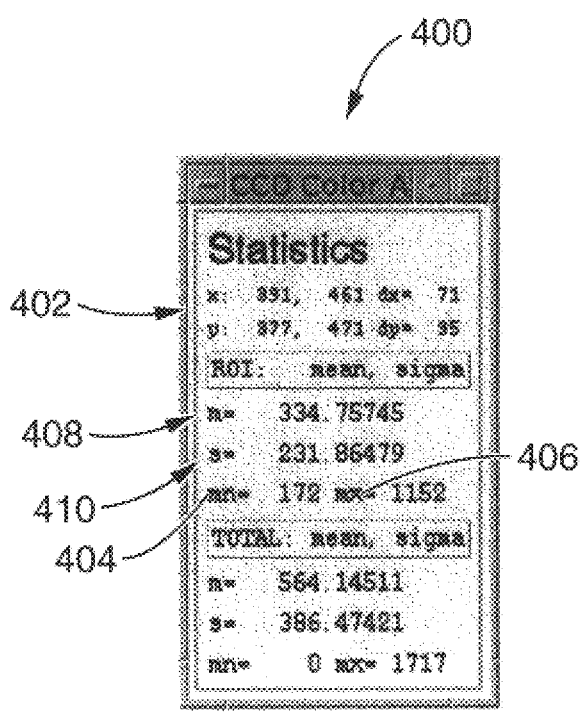
FIG. 5 is a statistics window in accordance with the present invention.

Referring to FIG. 5, image intensity statistics including mean, standard deviation, minimum, and maximum are calculated and displayed upon request in the Statistics Window 400. When a region of interest is drawn by the user, the coordinates 402 of the lower-left corner and the widths of the region are shown. In addition, the minimum 404, maximum 406, mean 408, and standard deviation 410 are calculated and displayed. When the user moves the region of interest (see Section 2), the statistics are re-calculated. Statistics for the full image are only calculated upon request. Since the full-image statistics can take much longer (a few seconds) to calculate, there is no reason to delay the user except upon request.

5. Analysis Toolbox

Advantageously, a toolbox of various analytical tools can be incorporated into the GUI-based image acquisition interface for IDL in accordance with the present invention. By way of example, and not of limitation, the analysis toolbox described herein is a graphical user interface (GUI)-based computer program that facilitates the use of a phase-shifting point-diffraction interferometer. The toolbox is designed to be used as a part of the GUI-based image acquisition interface for IDL, where it provides real-time data analysis support for images acquired during the alignment and use of a phase-shifting point-diffraction interferometer (PS/PDI), but can be used with other image acquisition software.

The toolbox programs described here are also written in IDL and use IDL's widget libraries to control the on-screen display and user interface. Four tools described here share the same toolbox window, but are used individually and operate somewhat independently.

Figure 6:
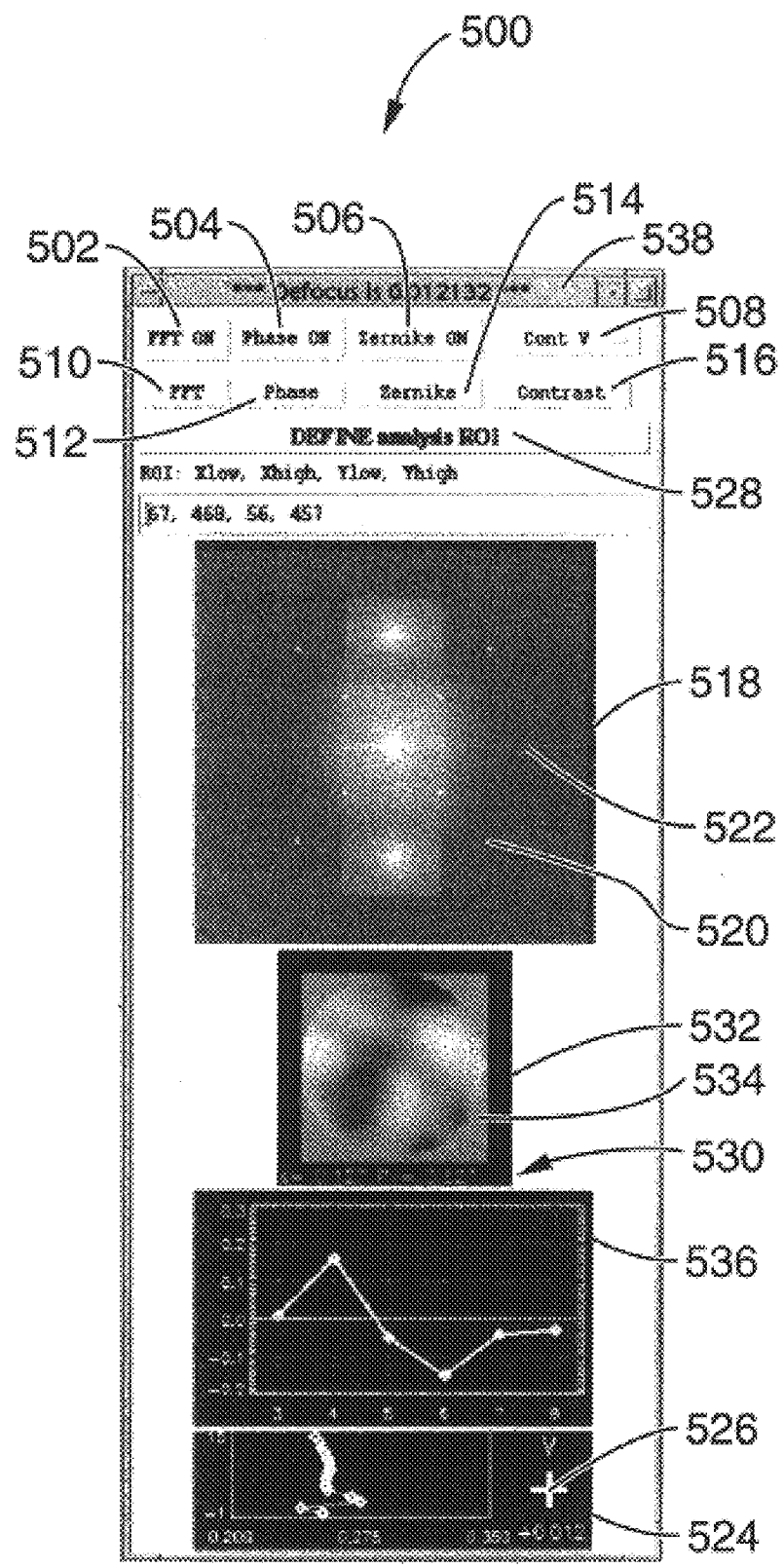
FIG. 6 is a toolbox window in accordance with the present invention.

Referring to FIG. 6, an example of the toolbox window 500 is shown. Each tool may be independently turned on or off using FFT ON 502, Phase ON 504, and Zernike ON 506 buttons, and a Contrast pull-down menu 508 at the top; the window contracts and expands vertically to fit the number of tools in use. A second row of buttons FFT 510, Phase 512, Zernike 514 and Contrast 516 at the top of the window instructs the program to execute each individual sub-routine on demand. In addition, the windows themselves are sensitive to activation with a mouse-click. When the tools are activated, or "ON", the buttons change to read FFT OFF, Phase OFF, and Zernike OFF, respectively. The contrast tool is turned on and off via pull-down menu 508 with three options: OFF, Cont H, and Cont V. The latter two instruct the program to automatically calculate fringe contrast along either a horizontal or a vertical line.

Four tools are described herein. They are the Fourier-transform Alignment Tool, the Contrast Tool, the Wavefront Tool, and the Zernike Polynomial Tool. It is not difficult to modify the existing tools or add additional tools to expand the capabilities of the toolbox.

5.1 The Fourier-transform Alignment Tool

The uppermost graphical sub-window 518 is the Fourier-transform alignment tool. When this tool is active, as images are acquired from the CCD, the magnitude of the Fourier-transform is calculated and displayed on a logarithmic scale. Use of the Fourier-transform has been found to aid tremendously in the alignment of the PS/PDI. Since the CCD records data in a far-field of the image-plane, the Fourier-transform of the detected signal provides a pseudo-image of the electrical field in the image-plane where fine alignment is taking place.

By default, only the central data-containing region of the Fourier-transform is displayed. Image-plane alignment of the PS/PDI involves directing one focused beam through a tiny pinhole, and a second beam through an adjacent window. Small white alignment marks 520 are added to the image as alignment guides to help direct the positioning of the two beams. The position of the alignment marks are based on foreknowledge of the image-plane mask pattern.

A mouse-click on the graphic window where the Fourier-transform is displayed causes the program to zoom-in on one specific region of the display. The center of the zoomed region depends on the location of the mouse-click. When the zoomed display is active, the word "Zoomed" appears in the lower-left corner of the image to inform the user that this feature is enabled.

An additional feature of the Fourier-transform Alignment Tool is the placement of a user-defined reference point that serves as a sort of visual memory for the system. Using the second mouse button and clicking in the graphic window, places a small white-on-black cross-hair 522 that is drawn at the location of the mouse-click. The function of this reference point is to remember a specific position in the display as the system is aligned. During fine alignment, the position of the brightest point moves with the image place components. Therefore, when the interferometer is well-aligned, the reference point can be placed on the brightest point in the display. As the system is later re-aligned, adjustments can be made to bring the brightest point in the display to coincide with the previously-defined reference point.

5.2 The Contrast Tool

The finest steps of the alignment of the PS/PDI are based on the observed fringe contrast. The fringe contrast reaches a maximum at the position of optimal alignment, but the variations are often too subtle to be accurately judged by eye. Using only a narrow stripe of the image data, taken perpendicular to the interference fringes, the contrast is calculated very rapidly. In the calculation the energy content of the first-order peak is compared to the zeroth-order, and the ratio is related to the fringe contrast.

Alignment requires assessing the position of maximum fringe contrast without foreknowledge of what that contrast value will be. On a simple plot with an automatically adjusting abscissa scale, the contrast values of the last fifteen images are displayed. While any number of images can be plotted, the number fifteen is arbitrarily chosen to be a demonstrated good working value. This is shown in window 524 at the bottom of FIG. 6. With each new image, the contrast is automatically calculated and a new point is added to the bottom of the vertically-scrolling plot. In this way the alignment trend is easily established, and the operator can quickly judge whether the contrast is improving, worsening, or has reached its maximum. Furthermore a large "+" or "−" 526 appears in the window to indicate whether the new image is better than or worse than the one immediately previous.

Using the pull-down menu 508 at the top of the toolbox window, the direction of the data stripe used to assess contrast can be set to vertical or horizontal. The stripe always includes the line that passes through the point-of-interest selected by the user in the image-display window 100 shown in FIG. 2.

As can be seen, therefore, this tool provides means for computing and displaying the fringe contrast of the acquired image, including a comparison with previously recorded contrast values.

5.3 The Wavefront Tool

One of the primary goals of interferometric measurements is to assess the quality of an optical system under test. The assessment is primarily concerned with the phase of the wave transmitted by the test optic. While perfect optical systems generate nearly straight interference fringe patterns in the PS/PDI, aberrated optical systems cause the fringes to curve and bend. This behavior reveals the aberrations in the optical system.

Accurate analysis of the interferometric data can take several minutes to perform for an experienced operator working with a high-speed computer workstation. However, by sacrificing some accuracy, methods are available to analyze interferograms in one or two seconds, or faster. This level of analysis is of great assistance both for assessing the quality of the system under test, and also to improve the alignment of the interferometer itself.

Wavefront analysis is performed on a sub-domain of the full area recorded with the CCD camera. Typically, this is a circular sub-domain covered by the interference fringe pattern. When comparing wavefront measurements calculated from several separate images, it is usually beneficial to analyze data on the same sub-domain. For this purpose, a button 528 labeled "DEFINE analysis ROI" (ROI="region of interest") has been placed on the toolbox window. In fact, the Wavefront Tool, and the Zernike Polynomial Tool cannot be made active until an analysis ROI has been defined. The aforementioned button initiates an interactive sub-routine in which the user views the most recently acquired image, and uses the mouse to define the size and position of a circular sub-domain that will be used for analysis. The coordinates 530 of the edges of the sub-domain are shown in the toolbox window 532. These number fields are editable with keyboard insertion and deletion, providing an alternative way of defining the analysis sub-domain.

The Wavefront Tool uses the Fourier-transform method of interferogram analysis [1], [2] to rapidly process the images and produce a low-resolution phase-map. The calculation is initiated by the button 504 near the top of the window, or by a mouse-click in the graphical window that contains the phasemap. The peak-to-valley and rms magnitude of the wavefront are calculated and displayed below a grayscale representation of the phasemap. The phasemap 534 shown in window 532 represents the wavefront of the interference pattern 116 shown in FIG. 2.

At present the wavefront calculations typically require more than one second to perform. This limits their use in real-time alignment or optical adjustment with feedback based on the instantaneously measured system wavefront. For this reason, even when the tool is active, new wavefront calculations are performed only upon user request (at the click of either the button 504 near the top of the window, or on the graphical display 532 itself). As computation speed increases, it is reasonable to assume that wavefront calculations may be performed in a fraction of a second, even with higher spatial resolution and accuracy. In such circumstances, this tool could be made real-time, and calculations would be performed on every new image, without the necessity of user instigation.

5.4 The Zernike Polynomial Tool

Once the wavefront has been calculated, reduction of the data to a set of orthogonal Zernike Circle polynomials is a straightforward matter [3]. The individual Zernike polynomials are used to separately describe the defocus, astigmatism, coma, spherical aberration of the optical system under test. In this rapid analysis, only the first few Zernike polynomials are calculated. The results are shown in window 536.

The most important alignment parameter to benefit from this kind of feedback is focus. When the PS/PDI is out-of-focus by much more than a micron, fringe contrast becomes poor and data acquisition becomes difficult. The wavefront phasemap can be used to assess the defocus parameter directly, and the system can rapidly be adjusted into optimum focus after two or three images have been recorded. By adjusting the longitudinal alignment for each of several measurements, the zero-point of defocus (the optimum focus) can be predicted and attained.

The Zernike Polynomial Tool is used so often for focusing, that the most recently calculated magnitude of defocus is written across the title-bar 538 of the window.

It will be appreciated that, while the preferred embodiment includes the previously described means for computing and displaying a plot of orthogonal Zemike Circle polynomials from the wavefront, this tool can be modified to computer and display a plot of any appropriate polynomials.

6. Hardware/Software Interface

Figure 7:
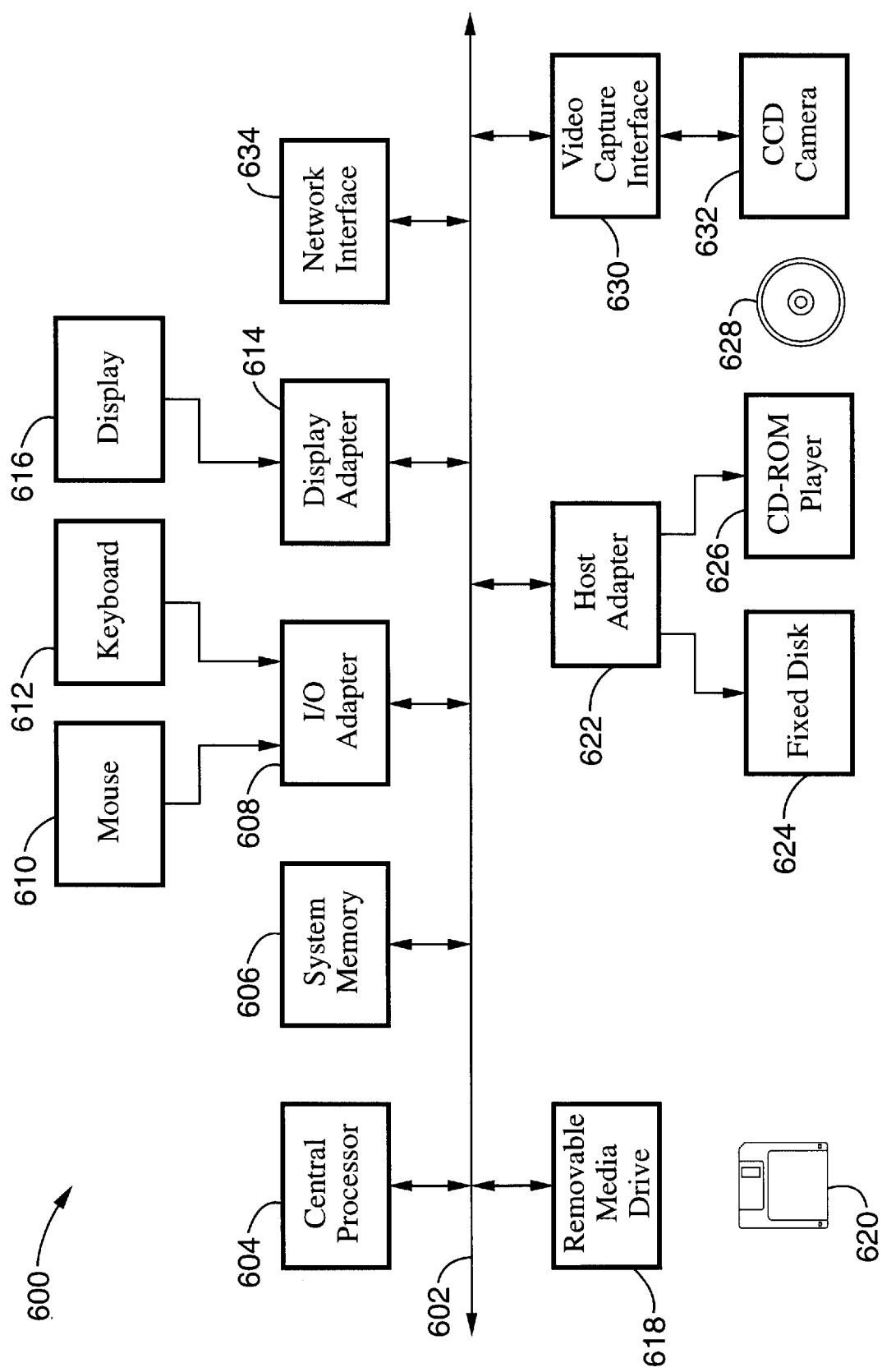
FIG. 7 is a functional block diagram of a computer system suitable for implementing the present invention.

Referring now to FIG. 7, a functional block diagram of a computer system 600 suitable for implementing the present invention is shown. Such a computer system 600 typically includes a bus 602 which interconnects major subsystems such as a programmable data processor 604, system memory 606 (typically RAM), an input/output (I/O) adapter 608 to which input devices such as a mouse 610 and keyboard 612 are connected, a display adapter 614 to which a thin film transistor (TFT) or cathode ray tube (CRT) display 616 is connected, a removable media drive 618 for receiving a floppy disk or other removable media 620, a host adapter 622 connected to a fixed disk 624, a CD-ROM drive 626 for receiving a readable or read/write CD-ROM 628, or other mass storage device, a video capture interface 630 connected to an image input device such as a CCD camera 632, and a network interface 634 for providing a connection to a local network server through an Ethernet® connection or the like, or to a remote server through a telephone link or though the Internet. Those skilled in the art will appreciate that other devices and subsystems could be included, and that the devices and subsystems shown may be interconnected in different ways than shown in FIG. 7. It will further be appreciated that not all of the devices shown are necessary to practice the present invention, and that the present invention may be implemented on any conventional computer system under processor control. Additionally, it will be understood that the operable software or code for implementing the present invention may be stored in computer readable storage media such as system memory 606, removable media 620, fixed disk 624 or CD-ROM 628.

Figure 8:
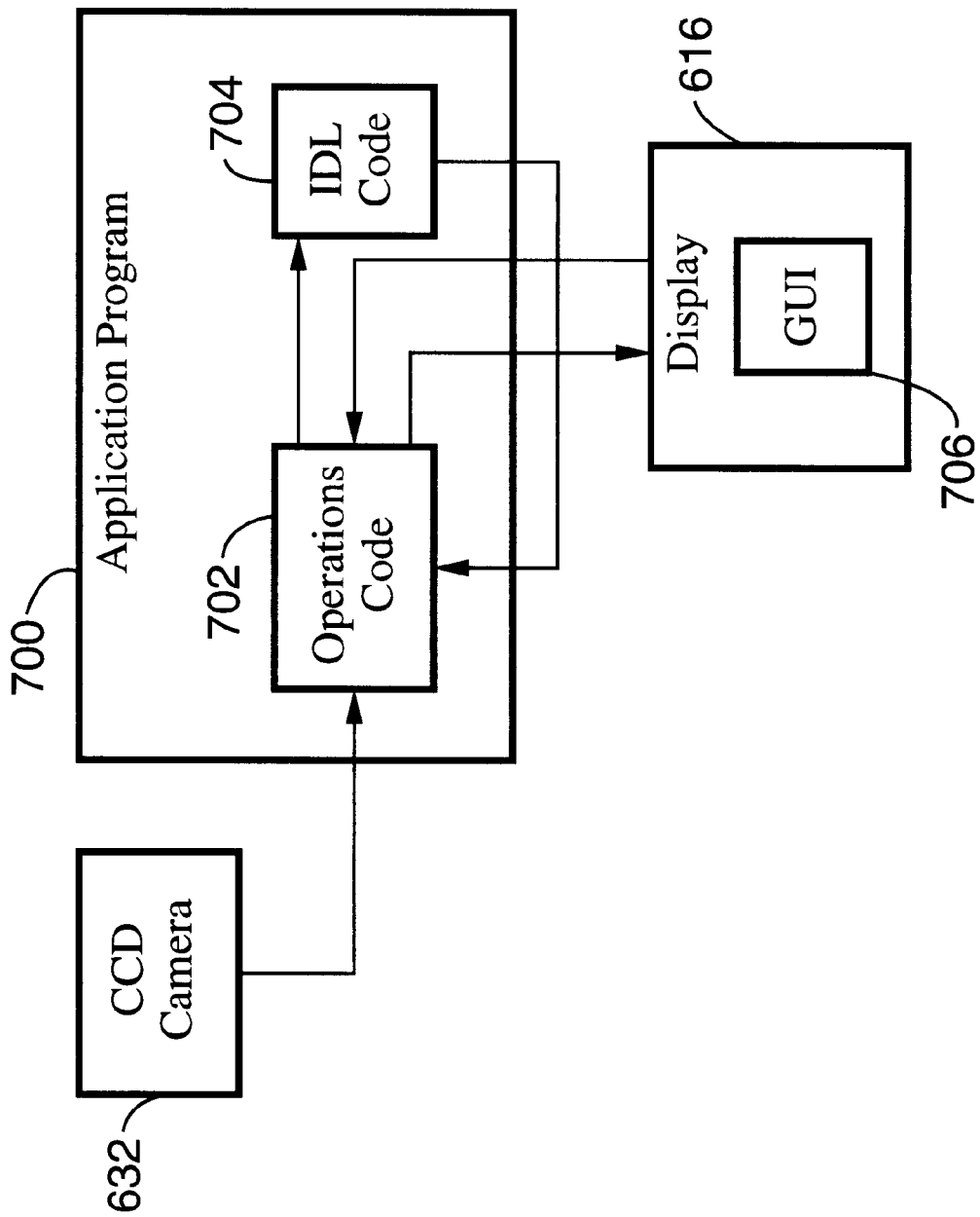
FIG. 8 is a functional block diagram of the application program of the present invention.

Referring also to FIG. 8, function block diagram of a GUI interface application program 700 in accordance with the present invention is shown. Application program 700, which runs on processor 604, includes operations code 702 that accesses the CCD camera 632 and IDL code 704, and displays a GUI 706 on display 616 which provides the functions described above. Those skilled in the art will appreciate that the operations code 702 to implement the invention as described herein can be written for various platforms using conventional programming techniques. Accordingly, the details of the operations code 602 are not presented herein.

Accordingly, it will be seen that this invention provides a convenient graphical user interface for CCD camera control, and image acquisition, processing and analysis, and eliminates the need of first saving images in one program and then importing the data into IDL for analysis in a second step. The invention also provides the user with a toolbox of real-time analysis applications for use in connection with an extreme ultraviolet (EUV) phase-shifting point-diffraction interferometer (PS/PDI), and can be customized for various image acquisition, processing and analysis applications. The toolbox, which is a graphical user interface itself, can be integrated with the GUI described herein or with any image acquisition software to provide the advantage of automatic and real-time processing and analysis of images as they are acquired. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A computer operable graphical user interface for image acquisition and processing, comprising:
   (a) means for displaying a plurality of selectable graphical objects;
   (b) means for controlling an image input device by selection of one or more of said graphical objects;
   (c) means for displaying and manipulating an image acquired from said image input device by selection of one or more of said graphical objects;
   (d) means for saving and loading a data file associated with said image by selection of one or more of said graphical objects;
   (e) means for calculating and displaying the magnitude of a Fourier-transform of an image acquired from said image input device;
   (f) means for computing and displaying a plot of the contrast of said acquired image;
   (g) means for computing and displaying a wavefront phasemap of a sub-domain of said acquired image; and
   (h) means for computing and displaying a plot of polynomials from said wavefront.

2. A computer operable graphical user interface for image acquisition and processing, comprising:
   (a) means for displaying a plurality of selectable graphical objects;
   (b) means for controlling an image input device by selection of one or more of said graphical objects;
   (c) means for displaying and manipulating an image acquired from said image input device by selection of one or more of said graphical objects; and
   (d) means for saving and loading a data file associated with said image by selection of one or more of said graphical objects;
   (e) wherein said means for controlling an image input device comprises:
      means for controlling image exposure time;
      means for controlling hardware binning;
      means for controlling image input device readout speed;
      means for selecting
         (i) a run mode wherein images are continuously acquired and displayed,
         (ii) a step mode where a single image is acquired, and
         (iii) a phase mode where multiple images are recorded and automatically saved with sequential file names;

means for selecting hardware-adjustable delay-times that synchronize a read-out associated with said image input device with the opening and closing of a shutter mechanism associated with said image input device;

means for selecting customizable data acquisition modes;

means for selecting the number of images the image input device rapidly reads and discards before the image to be inspected is recorded;

means for selecting between a demo mode where all of the functions of the graphical user interface are available except data acquisition and a CCD mode where communication with the image input device is initiated;

means for displaying the time remaining for an exposure with said image input device; and means for displaying messages associated with data acquisition.

3. A computer operable graphical user interface for image acquisition and processing, comprising:

(a) means for displaying a plurality of selectable graphical objects;

(b) means for controlling an image input device by selection of one or more of said graphical objects;

(c) means for displaying and manipulating an image acquired from said image input device by selection of one or more of said graphical objects; and (d) means for saving and loading a data file associated with said image by selection of one or more of said graphical objects;

(e) wherein said means for displaying and manipulating an image comprises:

means for selecting and displaying the brightness value of an individual pixel of said image and displaying pixel coordinates;

means for displaying horizontal and vertical lineouts on a displayed image;

means for adjusting image colors or grayscales, and gamma-scaling;

means for image display zooming/scaling; and means for selecting between automatic and manual image scaling.

4. A computer operable graphical user interface for image acquisition and processing, comprising:

(a) means for displaying a plurality of selectable graphical objects;

(b) means for controlling an image input device by selection of one or more of said graphical objects;

(c) means for displaying and manipulating an image acquired from said image input device by selection of one or more of said graphical objects; and (d) means for saving and loading a data file associated with said image by selection of one or more of said graphical objects;

(e) wherein said means for file saving and loading comprises:

means for selecting a file name based on the date and an index number for an image file;

means for selecting a file storage format;

means for saving an image file;

means for selecting an image file for loading;

means for selecting background subtraction whereby the intensity values of a first image are subtracted from a second image;

means for saving an image as a background image;

means for loading a saved file as a background image wherein said loaded image is automatically subtracted from a current image for display; and means for sending an image file to a printer.

5. A computer operable graphical user interface for image acquisition and processing, comprising:

(a) means for displaying a plurality of selectable graphical objects;

(b) means for controlling an image input device by selection of one or more of said graphical objects;

(c) means for displaying and manipulating an image acquired from said image input device by selection of one or more of said graphical objects;

(d) means for saving and loading a data file associated with said image by selection of one or more of said graphical objects; and (e) a statistics window for calculating and displaying mean, standard deviation, minimum, and maximum for a selected portion of said image.

6. An apparatus for image acquisition and processing having a graphical user interface, comprising:

(a) a programmable data processor; and (b) programming associated with said programmable data processor for carrying out the operations of (i) displaying a plurality of selectable graphical objects, (ii) controlling an image input device by selection of one or more of said graphical objects, (iii) displaying and manipulating an image acquired from said image input device by selection of one or more of said graphical objects, (iv) saving and loading a data file associated with said image by selection of one or more of said graphical objects, (v) calculating and displaying the magnitude of a Fourier-transform of an image acquired from said image input device, (vi) computing and displaying a plot of the contrast of said acquired image, (vii) computing and displaying a wavefront phasemap of a sub-domain of said acquired image, and (viii) computing and displaying a plot of polynomials from said wavefront.

7. An apparatus for image acquisition and processing having a graphical user interface, comprising:

(a) a programmable data processor; and (b) programming associated with said programmable data processor for carrying out the operations of (i) displaying a plurality of selectable graphical objects, (ii) controlling an image input device by selection of one or more of said graphical objects, (iii) displaying and manipulating an image acquired from said image input device by selection of one or more of said graphical objects, (iv) saving and loading a data file associated with said image by selection of one or more of said graphical objects, (v) controlling image exposure time, (vi) controlling hardware binning, (vii) controlling image input device readout speed, (viii) selecting a run mode wherein images are continuously acquired and displayed, a step mode where a single image is acquired, and a phase mode where multiple images are recorded and automatically saved with sequential file names, (ix) selecting hardware-adjustable delay-times that synchronize a read-out associated with said image input device with the opening and closing of a shutter mechanism associated with said image input device, (x) selecting customizable data acquisition modes, (xi) selecting the number of images the image input device rapidly reads and discards before the image to be inspected is recorded, (xii) selecting between a demo Mode where all of the functions of the graphical user interface are available except data acquisition and a CCD mode where communication with the image input device is initiated, (xiii) displaying the time remaining for an exposure with said image input device, and (xiv) displaying messages associated with data acquisition.

8. An apparatus for image acquisition and processing having a graphical user interface, comprising:

(a) a programmable data processor; and (b) programming associated with said programmable data processor for carrying out the operations of (i) displaying a plurality of selectable graphical objects, (ii) controlling an image input device by selection of one or more of said graphical objects, (iii) displaying and manipulating an image acquired from said image input device by selection of one or more of said graphical objects, (iv) saving and loading a data file associated with said image by selection of one or more of said graphical objects, (v) selecting and displaying the brightness value of an individual pixel of said image and displaying pixel coordinates, (vi) displaying horizontal and vertical lineouts on a displayed image, (vii) adjusting image colors or grayscales, and gamma-scaling, (viii) image display zooming/scaling, and (ix) selecting between automatic and manual image scaling.

9. An apparatus for image acquisition and processing having a graphical user interface, comprising:

(a) a programmable data processor; and (b) programming associated with said programmable data processor for carrying out the operations of (i) displaying a plurality of selectable graphical objects, (ii) controlling an image input device by selection of one or more of said graphical objects, (iii) displaying and manipulating an image acquired from said image input device by selection of one or more of said graphical objects, (iv) saving and loading a data file associated with said image by selection of one or more of said graphical objects, (v) selecting a file name based on the date and an index number for an image file, (vi) selecting a file storage format, (vii) saving an image file, (viii) selecting an image file for loading, (ix) selecting background subtraction whereby the intensity values of a first image are subtracted from a second image, (x) saving an image as a background image, (xi) loading a saved file as a background image wherein said loaded image is automatically subtracted from a current image for display, and (xii) sending an image file to a printer.

10. An apparatus for image acquisition and processing having a graphical user interface, comprising:

(a) a programmable data processor; and (b) programming associated with said programmable data processor for carrying out the operations of (i) displaying a plurality of selectable graphical objects, (ii) controlling an image input device by selection of one or more of said graphical objects, (iii) displaying and manipulating an image acquired from said image input device by selection of one or more of said graphical objects, (iv) saving and loading a data file associated with said image by selection of one or more of said graphical objects, and (v) displaying a statistics window for calculating and displaying mean, standard deviation, minimum, and maximum for a selected portion of said image.

11. A computer operable graphical user interface, comprising:

means for calculating and displaying the magnitude of a Fourier-transform of an image acquired from an image input device;

means for computing and displaying a plot of the contrast of the acquired image;

means for computing and displaying a wavefront phasemap of a sub-domain of the acquired image; and means for computing and displaying a plot of polynomials from said wavefront.

12. A computer operable graphical user interface as recited in claim 11, wherein said image input device comprises a phase-shifting point-diffraction interferometer.

13. An apparatus for image acquisition and processing having a graphical user interface, comprising:

(a) a programmable data processor; and (b) programming associated with said programmable data processor for carrying out the operations of calculating and displaying the magnitude of a Fourier-transform of an image acquired from an image input device, computing and displaying a plot of the contrast of the acquired image, computing and displaying a wavefront phasemap of a sub-domain of the acquired image, and computing and displaying a plot of polynomials from said wavefront.

* * * * *